Nov. 30, 1948.  A. PEDERSEN  2,455,189
WORK HOLDER FOR WOODWORKING MACHINES
Filed Aug. 7, 1945  2 Sheets-Sheet 1
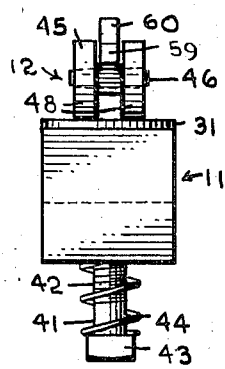
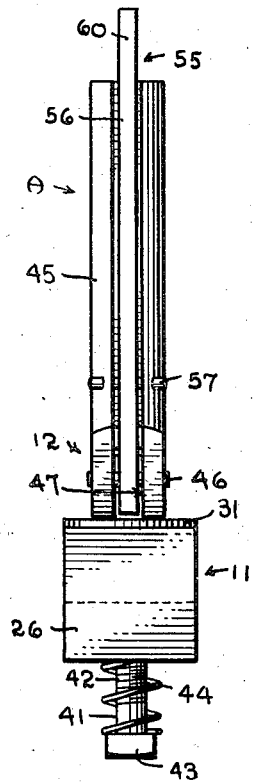
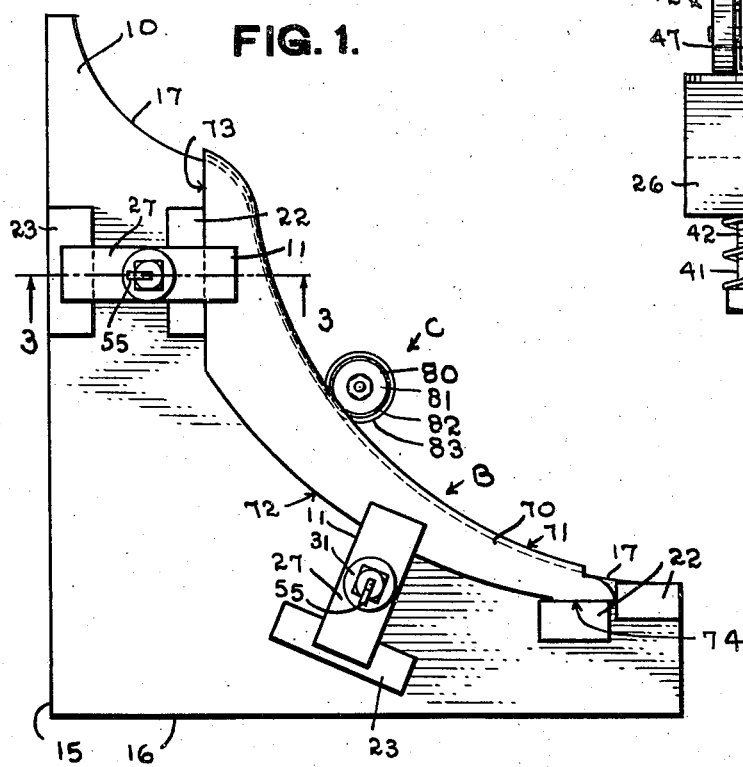
INVENTOR.
Alfred Pedersen
BY *Lancaster, Allwine Rommel*
ATTORNEYS.

Nov. 30, 1948.  A. PEDERSEN  2,455,189
WORK HOLDER FOR WOODWORKING MACHINES
Filed Aug. 7, 1945  2 Sheets-Sheet 2
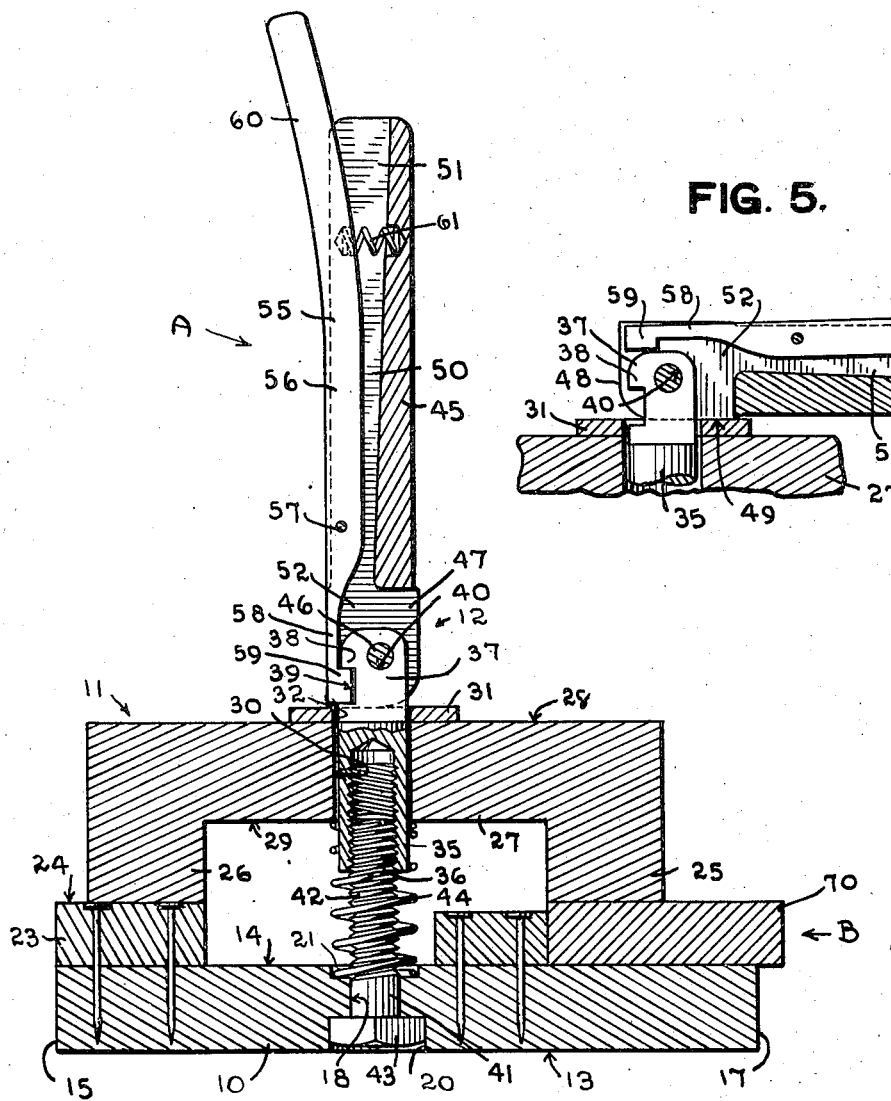
INVENTOR.
Alfred Pedersen Patented Nov. 30, 1948

2,455,189

UNITED STATES PATENT OFFICE 2,455,189

WORK HOLDER FOR WOODWORKING MACHINES

Alfred Pedersen, Warren, Pa.

Application August 7, 1945, Serial No. 609,396

2 Claims. (Cl. 144—290)

This invention relates to woodworking machines and more particularly to clamps or holddowns for association with such machines, for firmly and detachably holding work-pieces in place during cutting and shaping operations thereon.

An important object of the invention is to provide a cam-actuated clamp which will hold work pieces of irregular shapes securely and will not tend to split nor mar the same.

Another important object is to provide such a clamp which, when the workpiece is clamped thereto, may be manually manipulated for cutting or shaping operations, since it is of light weight, although sturdy, and so balanced that, with the average workpiece clamped therein, it is not top heavy. Neither is it cumbersome.

Still another important object is to provide a cam-actuated clamp of this kind, including a handle which serves both as a means to effect a clamping action and as a means for grasping by the hand of the operator in manipulating the clamp with the workpiece held therein.

An object of the invention is to provide a clamp of few parts and one that is readily disassembled for repairs, storage, packing and shipment.

Other objects and advantages of the invention will appear during the course of the following detailed description of the invention, taken in connection with the accompanying drawings, forming a portion of the specification, and in which drawings:

Figure 1 is a top plan of two of the novel clamps, engaging a workpiece which is being worked up by a cutter.

Figure 2 is an end elevation of the clamp, removed from a bedplate, with the handle portion raised into a clamping position.

Figure 3 is a vertical section through the clamp and workpiece, upon substantially the line 3—3 of Figure 1.

Figure 4 is a view, somewhat similar to Figure 2, but with the handle lowered.

Figure 5 is a fragmentary sectional view with the handle lowered, for comparison with Figure 3.

In the drawings, wherein for the purpose of illustration is shown a preferred embodiment of the invention and wherein similar reference characters designate corresponding parts throughout the several views, the letter A designates the novel clamp, and the letter B a work piece being worked upon by a rotary cutter or shaper C.

The novel clamp A includes a suitable bed plate 10, which may also constitute a form for the work piece B, clamp body 11, and lever or clamp actuator mechanism 12.

The bed plate 10 may take various shapes and, in the example shown in Figure 1, is one adapted for association with the particular work piece B. This bed plate 10 comprises a body portion having substantially flat opposite faces 13 and 14, two intersecting, substantially straight edges 15 and 16 forming a right angle, and an arcuate face or edge 17 joining the edges 15 and 16 and conforming to the shape of the work piece B. This face 17 provides a guide for movement of the cutter C. Extending through the bed plate 10 is a perforation 18, shown in Figure 3, for each clamp body 11 and clamp actuator mechanism 12. About this perforation 18 is a bolt head-accommodating recess 20, in the face 13 and a shallow spring end-accommodating recess 21 in the face 14. The bed plate 10 may carry a suitable number of stops 22, to limit movement of the work piece B, as well as end supports 23 for the clamp body 11. The supports 23 are, preferably, flat-faced, as at 24 in Figure 3, and of substantially the same thickness as the work piece B. They are spaced remote from the edge or face 17, as shown in Figure 3.

As for the clamp body 11, shown in section in Figure 3, and in elevation in Figures 2 and 4; this includes, preferably, a pair of spaced-apart abutments or ends, one being a work-engaging abutment 25 and the other being an end support-engaging abutment 26, for a bridgepiece 27 which bridges them, and has outer and inner faces 28 and 29 respectively. Extending through the bridge piece 27, at substantially its axial center is a perforation 30 for portions of the lever or clamp actuator mechanism 12. The bridge piece 27 and abutments 25 and 26 may be integral. Included, as a portion of the clamp body 11 and more particularly of the outer face 28 may be a flat cam-face-receiving member 31. This may be a metallic disc, having a central opening 32 aligning with and of substantially the same diameter as the perforation 30 and disposed upon the outer face 28.

The lever or clamp-actuator mechanism 12, shown more particularly in Figures 2 to 5 inclusive, includes a member 35, slidable through the perforation 30 and projecting from the faces 28 and 29. This member 35 has a screw threaded socket 36 in its end which projects from the face 29 and a bill portion 37 having a bill 38 projecting from the face 28, there being a somewhat square recess 39 below the bill 38. A pivot pin-accommodating perforation 40 extends through the bill portion 37. Preferable, the bill portion 37 is somewhat reduced in thickness over the general thickness of the member 35.

Associated with the member 35 is a means to detachably and adjustably secure it to the bed plate 10. This is shown, particularly in Figure 3, as a bolt-like member 41, having a screw threaded shank portion 42 extending upwardly through and projecting from the perforation 18 with its screw threads in cooperation with those of the member 35. The head portion 43 of the bolt is accommodated in the recess 20.

About the shank portion 42 is disposed an expansion coil spring 44 with one end accommodated in the shallow recess 21 and the other end bearing against the face 29, for urging the structure 25 to 27 inclusive away from the bed plate 10.

Also associated with the member 35 is a handle 45, pivoted to the bill portion 37 as by a pivot pin 46 extending through the perforation 40 and through a like perforation in the handle 45 adjacent its end 47. This end 47 carries a cam face or edge 48 and also a substantially flat edge or face 49 adjoining the cam face 48, one merging into the other. The flat face 49 is nearer the pivot pin 46 than is the cam face 48, so that, when proper adjustment is made, by means of the screw threads, between the members 35 and 41, and the handle 45 is in the position shown in Figures 2 and 3, i. e., vertical or raised, the cam face 48 will bear against the cam face-receiving member 31 of the clamp body 11, and force the abutments 25 and 26 in tight engagement with work B and end support 23 respectively. However, when the handle 45 is in the horizontal or lowered position as in Figures 4 and 5, and, because the flat face 49 is nearer the pivot pin 46, the clamp body may rise, urged by the spring 44, and the work piece B may be removed.

The handle 45 may be somewhat U-shaped in horizontal section, so that a longitudinally-extending slot 50 is provided from the outer end 51 of the handle to adjacent the pivot pin 46, where the slot merges into a transversely-extending slot 52 to accommodate the bill portion 37 of the member 35 as well as a portion of a lever 55 to be next described.

The lever 55 includes a preferably slightly bowed handle portion 56, to afford a good hand grasp, pivoted intermediate its ends, as by the pin 57, to the handle 45 so as to lay mostly within the slot 50. This lever 55 terminates at its inner end portion 58 in a projection 59, which may be suitably shaped to fit under the bill 38 and into the recess 39, when the handle is raised and the cam face 48 engages the member 31. Thus, the handle is held rigidly in the position shown in Figures 2 and 3, so that it may be grasped, intermediate its ends, in order to support and manipulate the clamp A and work piece B as when engaging the latter by the cutter C. However, if the outer end portion 60 is pressed toward the handle 45, as by the cupped fingers of the operator, the lever will pivot enough to cause the projection 59 to move out of the recess 39 and from under the bill 38 and the handle may then be lowered.

In order to normally retain the projection 59 within the recess 39, an expansion coil spring 61 is disposed adjacent the outer end portion 60 to bear thereagainst and against the handle 45.

The work piece B shown by way of example, is a Duncan Phyfe leg portion 70 having a concave outer face 71, and a convex inner face 72, as well as a flat inner face 73 and flat bottom face 74, and the positions of the stops 22 are such as to retain this leg portion in its correct position so that the edge or face 17 of the bed plate 10 affords a guiding edge for the cutter C, with the greater part of the leg portion 70 extending inwardly of the edge or face 17, and laying upon the face 14 of the bed plate. Since such a portion is rather long, two of the clamps 11 and their associated means 12 may be employed, as shown in Figure 1.

The cutter or shaper C may be any suitable one, but a conventional rotary cutter or groover 80 is shown by way of example. This includes one or more circular discs 81 each having a knife edge 82 and rotatably carried by a guide disc 83 which is adapted to roll over the face 17, whereby the conventional groove is cut into the leg portion 70.

Various changes may be made to the form of the invention herein shown and described without departing from the spirit of the invention or scope of the claims.

What is claimed is:

1. In woodworking apparatus, a work piece clamp including a clamp body having an outer face, end portions, a bridge piece extending from one portion to the other, said bridge piece having a perforation extending therethrough, a bed plate, a member slidably extending through said perforation and having a bill portion at its end extending from the outer face of said bridge piece and provided with a bill, means securing said member to said bed plate, a handle, having a longitudinally extending slot, a cam face and a substantially flat face, means pivoting said handle to said bill portion, said outer face being engageable by said cam face when said handle is in a position with its longitudinal axis substantially normal to the longitudinal axis of said bridge piece and said outer face engageable by said substantially flat face when said handle is in substantial parallelism with said bridge piece, said substantially flat face being nearer said pivoting means than is said cam face, and a lever pivoted to said handle, having a projection engaged by said bill when said handle is in one of said positions, said lever being disposed mainly within said slot and its pivot being spaced from said pivoting means.

2. In woodworking apparatus, a work piece clamp including a clamp body having an outer face; a bedplate therebelow; a member secured to said bedplate and slidably extending through said clamp body and projecting outwardly of the clamp body; a handle having a cam face and a substantially flat face merging into said cam face, and a slot extending longitudinally of said handle with its mouth opening from said handle at a face thereof opposite said substantially flat face; means pivoting said handle to said member adjacent the outwardly projecting end thereof, said outer face being engageable by said cam face when said handle is in a position with its longitudinal axis substantially normal to the longitudinal axis of said clamp body, said cam face being farther from said pivot means than is said substantially flat face; a lever pivoted to said handle intermediate its ends, disposed partly within said slot with its longitudinal edge portion extending outwardly of said slot from end to end of said lever; and means carried partly by said lever and partly by said member to couple said lever and member together when said handle is disposed with its longitudinal axis substantially normal to the longitudinal axis of said clamp body.

ALFRED PEDERSEN.

REFERENCES CITED

The following references are of record in the file of this patent:

UNITED STATES PATENTS

| Number | Name | Date |
|---|---|---|
| 878,491 | Barker | Feb. 11, 1908 |
| 1,728,030 | Bielski | Sept. 10, 1929 |
| 2,043,125 | Stahl | June 2, 1936 |
| 2,157,345 | Nelson | May 9, 1939 |